Oct. 28, 1930.  N. H. VAN SICKLEN, JR  1,779,684

INDICATOR

Filed Jan. 15, 1929

Inventor
Norton H. Van Sicklen Jr.
By Williams, Bradbury, McCaleb & Hinkle
Attys.

Patented Oct. 28, 1930

1,779,684

UNITED STATES PATENT OFFICE

NORTON H. VAN SICKLEN, JR., OF GENEVA, ILLINOIS, ASSIGNOR TO VAN SICKLEN CORPORATION, OF GENEVA, ILLINOIS, A CORPORATION OF DELAWARE

INDICATOR

Application filed January 15, 1929. Serial No. 332,676.

My invention pertains to indicators and is more particularly adapted for, although not limited to, indicators designed for mounting on the instrument panel of an automobile to indicate the mileage at which the engine oil should be changed or the chassis bearings lubricated.

It is now common practice for owners and operators of automobiles and other automotive vehicles to change the lubricating oil usually carried in the crank-case of the internal combustion engine and to lubricate the chassis bearings at regular intervals, dependent upon the mileage traveled by the vehicle. For example, it is a common practice to change the oil in the engine crank-case every thousand miles and to lubricate the chassis bearings every five hundred miles. The owner or operator of the vehicle is prone to forget the mileage at which he last performed these operations and therefore the mileage at which these operations should be again performed, and my invention is to facilitate the regular performance of these necessary duties in connection with the care and operation of automotive vehicles.

An object of my invention is to provide a new and improved indicator.

Another object is to provide a new and improved indicator particularly adapted for attachment to the instrument panel of an automobile and adapted to indicate the mileage at which a certain duty necessary to the proper maintenance of the vehicle is to be performed.

Another object is to provide an indicator having a novel arrangement of indicating devices and wherein a minimum number of such devices will provide a maximum of flexibility in a minimum space.

Another object is to provide a novel form of rotatable disk for carrying the indicia.

Another object is to provide novel means for maintaining these disks in selected position.

Another object is to provide novel means for mounting these disks and maintaining them in proper alignment relative to each other.

Another object is to provide novel means on the disks for facilitating their rotation.

Other objects and advantages will appear as the description proceeds.

Referring to the drawings.

Figure 1:
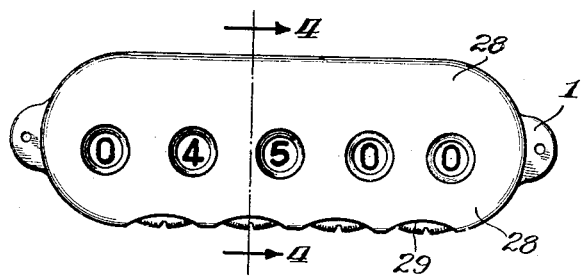
Fig. 1 is a front view of my new and improved indicator as it appears mounted in operative position.

Referring to the drawing, my new and improved indicator has a base indicated generally by the reference numeral 1 and comprising a main body portion 2 terminating in semi-circular supporting portions 3 and 4 and projections 5 and 6 formed as laterally extending continuations of the supporting portions 3 and 4. The projections 5 and 6 lie in a plane parallel to the plane of the body portion 2 and are adapted for clamping against the instrument board of an automotive vehicle or other object by means of bolts or similar devices extending through the openings 7 and 8 provided in the projections 5 and 6, respectively.

Figure 2:
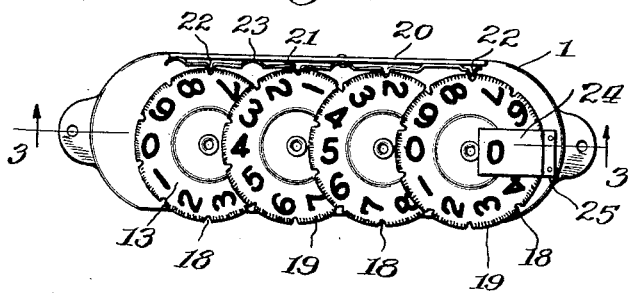
Fig. 2 is a view similar to Fig. 1, with the cover removed.

Disk supporting members 9, 10, 11 and 12 are punched out of the body portion 2 and each of these disk supporting members carries a rotatable disk 13. In the preferred embodiment illustrated in the drawing each disk is shown as held upon its supporting element by a retention washer 14 over which the upper end of the supporting element is flanged as indicated at 15 in Fig. 4. Each disk is preferably composed of stiff non-yielding material such as metal, and has a flat center part 16 surrounded by a beveled edge 17 forming a frustrum of a cone. The periphery of each disk is provided with a series of relatively large notches 18 and the upper face of each disk adjacent its periphery is serrated as shown at 19 in Fig. 2 of the drawing. In a preferred form of the invention the upper faces of the disks are painted white and the beveled edges of the disks are each provided with a series of red numerals running consecutively from "0" to "9," both inclusive.

Figure 4:
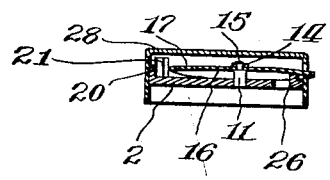
Fig. 4 is a section on line 4—4 of Fig. 1.

The body portion 2 is also provided with an upwardly extending flange indicated by the reference numeral 20 in Fig. 4 and secured to this flange by a rivet or otherwise is a spring 21 having sharp projections 22 for coacting with the notches 18 to hold the disks in any desired position. The spring 21 is also provided with rearwardly extending portions 23 intermediate the projections 22 and serving as resilient supports for forcing the projections 22 into the notches 18 of the various disks.

In order to shorten my indicator and make it less expensive to manufacture, I use one less disk than the total number of digits exposed to view, and in place of a rotatable disk to indicate the number of units I substitute a single fixed plate 24 which projects over the disk mounted on the supporting element 12. This fixed plate 24 has a foot 25 secured to the body portion 2 by rivets or similar fastening means. The upper face of this plate is also painted white and bears a single red zero thereon. It will be understood, of course, that my invention is not limited to red and white as colors for the numerals and the upper faces of the parts which carry the numerals but that any other contrasting colors may be used.

Figure 3:
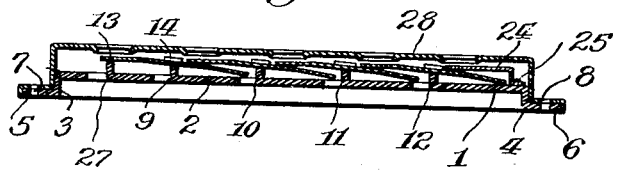
Fig. 3 is a section on line 3—3 of Fig. 2.

The disks 13 are mounted with their flat central portions lying at an angle to the body portion 2 and so arranged that the left-hand edge of each disk, as viewed in Fig. 3, rests upon the flat center portion of the adjacent disk. Guide fingers 26 are punched up from the body portion 2 and prevent rocking of the disks in a plane transverse to the lengthwise axis of the body portion 2. A special guide finger 27 is also provided for the left-hand edge of the last rotatable disk. An examination of Fig. 3 shows that my novel shape of rotatable disk permits overlapping of these disks without danger that the upper disk will wear away the painted numerals from the face of the disk therebeneath, since the numerals are painted on the beveled edges of the disks and the upper faces of these beveled edges are not in contact with the bottom surface of the overlapping disk.

My new and improved indicator is provided with a cover 28 which masks all except the selected numeral on each disk and the zero on the fixed plate. This cover is provided with an attractive finish in order to enhance the appearance of the device. The lower edge of the cover is cut away at 29 to expose the edges of the disks, thereby permitting the operator of the vehicle to rotate each disk by pressing his finger against the serrated upper edge thereof and thus shift the device to indicate the desired number.

It is to be understood that my invention is not limited to the precise structure disclosed in the drawing but that various changes and modifications may be made therein and that the scope of my invention is only limited by the following claims.

Having thus described a preferred embodiment of my invention, what I claim and desire to secure by United States Letters Patent is:

1. In an indicator of the class described, a base, a plurality of rotatable discs mounted on said base, each disc having a flat central portion and a beveled edge portion, and numerals spaced about the edge portion of each disc, one disc overlapping an adjacent disc and having its peripheral edge contacting with the flat portion of said adjacent disc, whereby the under side of the overlapping disc is spaced from the numerals on said adjoining disc.

2. In an indicator of the class described, a base including supports for mounting said base on an automobile, a plurality of rotatable metal discs mounted on portions struck up from said base, each disc having a flat central portion and a beveled edge portion, and numerals spaced about the edge portion of each disc, one disc overlapping an adjacent disc and having its peripheral edge contacting with the flat portion of said adjacent disc, fingers formed from said base for guiding said discs, a stationary member mounted on said base and overlapping one of said discs, said stationary member having indicia thereon, and a cover exposing indicia on said stationary member and selected indicia on said discs and further exposing the edges of said discs to permit manual rotation thereof.

3. In apparatus of the class described, the combination of a base, a plurality of rotatable discs carried by said base, each disc having a plurality of notches spaced about its edge, a member rigid with said base and lying substantially parallel to the edges of said discs and spaced therefrom, and a single spring for engaging the notches in all of said discs, said spring being secured to said member and having forwardly projecting portions for engaging said notches, said spring further having rearwardly projecting supporting portions intermediate said notch-engaging portions and spaced from the point of attachment of said spring to said member.

4. In an indicator of the class described, a base, a plurality of disc supporting members punched from said base, a plurality of rotatable discs carried by said member, each of said discs having a surface facing toward said base and a second surface facing away from said base, indicia carried by said surfaces facing away from said base, and a plurality of fingers integral with said base, said fingers contacting with the surfaces of said discs facing toward said base and serving to maintain said discs in predetermined positions relative to each other and to said base.

In witness whereof, I hereunto subscribe my name this 11th day of January, 1929.

NORTON H. van SICKLEN, Jr.